US009536210B2

(12) United States Patent
Handley et al.

(10) Patent No.: US 9,536,210 B2
(45) Date of Patent: Jan. 3, 2017

(54) ORIGIN-DESTINATION ESTIMATION SYSTEM FOR A TRANSPORTATION SYSTEM (71) Applicant: Xerox Corporation, Norwalk, CT (US)

(72) Inventors: John C. Handley, Fairport, NY (US); Qing Zhao, Ithaca, NY (US); Jeffrey David Kingsley, Macedon, NY (US)

(73) Assignee: XEROX CORPORATION, Norwalk, CT (US)

( * ) Notice: Subject to any disclaimer, the term of this patent is extended or adjusted under 35 U.S.C. 154(b) by 117 days.

(21) Appl. No.: 14/566,993

(22) Filed: Dec. 11, 2014

(65) Prior Publication Data
US 2016/0171882 A1 Jun. 16, 2016

(51) Int. Cl.
G01C 21/00 (2006.01)
G06Q 10/04 (2012.01)

(52) U.S. Cl.
CPC ..................... G06Q 10/04 (2013.01)

(58) Field of Classification Search
CPC combination set(s) only.
See application file for complete search history.

(56) References Cited

U.S. PATENT DOCUMENTS

| 8,090,532 | B2 | 1/2012 | Tashev et al. | |
| 8,494,771 | B2 * | 7/2013 | Delling | G06Q 10/047 701/533 |
| 8,909,475 | B2 * | 12/2014 | Gishen | G01C 21/3438 701/537 |
| 9,020,763 | B2 * | 4/2015 | Faaborg | G01C 21/26 701/117 |
| 9,304,009 | B2 * | 4/2016 | Beaurepaire | G01C 21/3438 |
| 9,404,760 | B2 * | 8/2016 | Ulloa Paredes | G01C 21/3423 |
| 9,435,658 | B2 * | 9/2016 | Geisberger | G01C 21/3446 |

(Continued)

FOREIGN PATENT DOCUMENTS

| EP | 2051223 A1 | 4/2009 |
| JP | 2002154612 A | 5/2002 |

(Continued)

OTHER PUBLICATIONS

Mai et al., "Visualizing bus schedule adherence and passenger load through Marey graphs", proceedings of the 18th ITS World Congress, Orlando, Oct. 16, 2011-Oct. 20, 2011.

(Continued)

Primary Examiner — Jonathan M Dager
(74) Attorney, Agent, or Firm — Fox Rothschild LLP (57) ABSTRACT To determine origin-destination (OD) data for a transportation system, a processor may receiving passenger statistics collected from a set of data collection devices deployed throughout the transportation system. The processor developing a model representing passenger usage of a portion of the transportation system. The model comprises nodes that each represent a geographical area of the transportation network, and links that represent transportation routes that connect two nodes. The system determines link utilization rates for each of the links by applying the passenger statistics to the model, and it generates an observation report comprising an origin-destination matrix for at least the portion of the transportation system so that the origin-destination matrix comprises the determined link utilization rates.

17 Claims, 10 Drawing Sheets

(56) References Cited

U.S. PATENT DOCUMENTS

| | | | |
|---|---|---|---|
| 2008/0077309 A1* | 3/2008 | Cobbold | G06Q 10/10 701/117 |
| 2010/0268447 A1* | 10/2010 | Griffiths | G01C 21/3423 701/532 |
| 2011/0112759 A1* | 5/2011 | Bast | G01C 21/3423 701/533 |
| 2012/0010803 A1* | 1/2012 | Min | G08G 1/123 701/117 |
| 2012/0173135 A1* | 7/2012 | Gutman | G01C 21/3469 701/408 |
| 2013/0046456 A1* | 2/2013 | Scofield | G01C 21/3423 701/117 |
| 2013/0262222 A1* | 10/2013 | Gibson | G06Q 10/025 705/14.49 |
| 2013/0304381 A1 | 11/2013 | Nesbitt | |
| 2013/0317742 A1* | 11/2013 | Ulloa Paredes | G06Q 10/063 701/533 |
| 2013/0317747 A1* | 11/2013 | Chidlovskii | G06N 5/02 701/540 |
| 2013/0317884 A1* | 11/2013 | Chidlovskii | G06Q 10/063 705/7.31 |
| 2014/0005934 A1* | 1/2014 | Chia | G01C 21/00 701/450 |
| 2014/0032113 A1* | 1/2014 | Nesbitt | G01C 21/3446 701/533 |
| 2014/0035921 A1 | 2/2014 | Yeh | |
| 2014/0089036 A1* | 3/2014 | Chidlovskii | G06Q 10/06 705/7.27 |
| 2015/0204685 A1* | 7/2015 | Gearhart | G01C 21/36 701/533 |

FOREIGN PATENT DOCUMENTS

| | | |
|---|---|---|
| WO | WO-0161276 A2 | 8/2001 |
| WO | WO-2007061264 A1 | 5/2007 |
| WO | WO-2009092812 A1 | 7/2009 |

OTHER PUBLICATIONS

Delling et al., "Round-Based Public Transit Routing", Proceedings of the 14th Meeting on Algorithm Engineering and Experiments (ALENEX'12).

* cited by examiner

| 0/0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| 1 |  | 5 | 5 | 0 | 0 | 0 | 0 | 0 | 0 | 0 | 0 | 0 | 0 | 0 | 34 | 0 |
| 2 | 2 |  | 35 | 5 | 0 | 40 | 0 | 0 | 0 | 0 | 0 | 0 | 0 | 0 | 0 | 0 |
| 3 | 0 | 0 |  | 28 | 0 | 58 | 0 | 0 | 0 | 0 | 0 | 27 | 0 | 0 | 0 | 0 |
| 4 | 0 | 0 | 100 |  | 0 | 31 | 0 | 0 | 0 | 0 | 0 | 0 | 0 | 0 | 0 | 0 |
| 5 | 0 | 7 | 0 | 0 |  | 9 | 0 | 0 | 0 | 0 | 0 | 7 | 0 | 0 | 0 | 0 |
| 6 | 0 | 0 | 0 | 1 | 42 |  | 0 | 0 | 0 | 0 | 0 | 0 | 0 | 0 | 0 | 0 |
| 7 | 0 | 13 | 0 | 0 | 0 | 0 |  | 0 | 0 | 0 | 0 | 10 | 0 | 0 | 0 | 0 |
| 8 | 0 | 56 | 0 | 8 | 26 | 22 | 39 |  | 0 | 0 | 0 | 0 | 0 | 0 | 0 | 0 |
| 9 | 0 | 13 | 0 | 1 | 0 | 0 | 0 | 12 |  | 0 | 0 | 0 | 0 | 0 | 0 | 0 |
| 10 | 0 | 0 | 0 | 0 | 0 | 0 | 0 | 0 | 0 |  | 217 | 40 | 0 | 0 | 1 | 0 |
| 11 | 0 | 0 | 0 | 0 | 0 | 0 | 0 | 17 | 0 | 243 |  | 0 | 1 | 132 | 0 | 0 |
| 12 | 0 | 0 | 0 | 0 | 0 | 0 | 0 | 0 | 0 | 30 | 0 |  | 0 | 401 | 2 | 0 |
| 13 | 100 | 19 | 0 | 0 | 0 | 0 | 0 | 0 | 0 | 0 | 0 | 0 |  | 0 | 0 | 0 |
| 14 | 0 | 0 | 0 | 0 | 0 | 0 | 0 | 0 | 0 | 27 | 93 | 183 | 0 |  | 0 | 0 |
| 15 | 0 | 0 | 0 | 0 | 0 | 0 | 0 | 0 | 0 | 0 | 0 | 0 | 0 | 0 |  | 0 |
| 16 | 100 | 0 | 0 | 0 | 0 | 0 | 0 | 0 | 0 | 0 | 24 | 0 | 0 | 35 | 19 |  |
| 17 | 0 | 0 | 0 | 0 | 0 | 0 | 0 | 0 | 0 | 0 | 0 | 0 | 0 | 0 | 0 | 0 |
| 18 | 0 | 0 | 0 | 0 | 0 | 0 | 0 | 0 | 0 | 0 | 0 | 0 | 0 | 85 | 0 | 0 |
| 19 | 0 | 0 | 0 | 0 | 0 | 0 | 0 | 0 | 0 | 0 | 0 | 0 | 0 | 0 | 0 | 0 |
| 20 | 0 | 0 | 0 | 0 | 0 | 0 | 0 | 0 | 0 | 0 | 0 | 0 | 0 | 0 | 5 | 0 |
| 21 | 0 | 0 | 0 | 0 | 0 | 0 | 0 | 0 | 0 | 0 | 0 | 0 | 0 | 0 | 1 | 0 |
| 22 | 0 | 2 | 0 | 0 | 0 | 0 | 0 | 0 | 0 | 0 | 0 | 0 | 0 | 0 | 2 | 0 |
| 23 | 0 | 0 | 0 | 0 | 0 | 0 | 0 | 0 | 0 | 0 | 23 | 0 | 0 | 6 | 0 | 0 |
| 24 | 0 | 0 | 0 | 0 | 0 | 0 | 0 | 0 | 0 | 0 | 0 | 0 | 0 | 100 | 0 | 0 |
| 25 | 0 | 0 | 0 | 0 | 0 | 0 | 0 | 0 | 0 | 0 | 0 | 0 | 0 | 0 | 0 | 0 |
| 26 | 0 | 1 | 0 | 0 | 0 | 0 | 0 | 0 | 0 | 0 | 0 | 0 | 0 | 0 | 1 | 0 |
| 27 | 0 | 0 | 0 | 0 | 0 | 0 | 0 | 0 | 0 | 0 | 0 | 0 | 0 | 0 | 1 | 0 |
| 28 | 0 | 1 | 0 | 0 | 0 | 0 | 0 | 0 | 0 | 0 | 0 | 0 | 0 | 0 | 3 | 0 |
| 29 | 0 | 0 | 0 | 0 | 0 | 0 | 0 | 0 | 0 | 0 | 34 | 0 | 0 | 0 | 0 | 0 |
| 30 | 0 | 0 | 0 | 0 | 0 | 0 | 0 | 0 | 0 | 0 | 27 | 0 | 0 | 0 | 0 | 0 |
| 31 | 0 | 0 | 0 | 0 | 0 | 0 | 0 | 0 | 0 | 0 | 20 | 0 | 0 | 0 | 0 | 0 |
| 32 | 0 | 0 | 0 | 0 | 0 | 0 | 0 | 0 | 0 | 0 | 47 | 0 | 0 | 0 | 0 | 0 |
| 33 | 0 | 0 | 0 | 0 | 0 | 0 | 0 | 0 | 0 | 0 | 10 | 0 | 0 | 0 | 0 | 0 |

| | 17 | 18 | 19 | 20 | 21 | 22 | 23 | 24 | 25 | 26 | 27 | 28 | 29 | 30 | 31 | 32 | 33 |
|---|---|---|---|---|---|---|---|---|---|---|---|---|---|---|---|---|---|
| | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 6 |
| | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 2 |
| | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 0 | 0 | 0 | 0 | 0 | 0 | 0 | 0 | 0 | 2 | 29 |
| | 0 | 0 | 1 | 2 | 10 | 0 | 77 | 50 | 15 | 4 | 7 | 7 | 0 | 0 | 0 | 1 | 40 |
| | 0 | 0 | 0 | 0 | 0 | 0 | 0 | 0 | 0 | 0 | 0 | 0 | 0 | 0 | 0 | 0 | 0 |
| | 52 | 0 | 0 | 0 | 0 | 0 | 0 | 0 | 0 | 0 | 0 | 0 | 0 | 0 | 0 | 0 | 0 |
| | 0 | 0 | 0 | 0 | 0 | 0 | 13 | 0 | 0 | 0 | 0 | 0 | 0 | 0 | 0 | 2 | 14 |
| | 0 | 0 | 0 | 0 | 0 | 0 | 0 | 0 | 0 | 0 | 0 | 0 | 0 | 0 | 0 | 0 | 0 |
| | 0 | 4 | 0 | 4 | 4 | 0 | 10 | 36 | 0 | 0 | 8 | 10 | 0 | 46 | 0 | 5 | 22 |
| | | 369 | 12 | 15 | 1 | 0 | 0 | 0 | 0 | 0 | 2 | 1 | 0 | 0 | 0 | 0 | 0 |
| | 37 | | 180 | 17 | 0 | 0 | 0 | 0 | 0 | 0 | 0 | 0 | 0 | 0 | 0 | 0 | 0 |
| | 0 | 0 | | 175 | 22 | 0 | 0 | 0 | 0 | 0 | 0 | 0 | 0 | 0 | 0 | 0 | 0 |
| | 63 | 69 | 0 | | 36 | 0 | 0 | 0 | 0 | 19 | 0 | 5 | 0 | 0 | 0 | 1 | 2 |
| | 0 | 0 | 0 | 0 | | 0 | 0 | 0 | 0 | 24 | 4 | 12 | 0 | 0 | 0 | 0 | 0 |
| | 2 | 0 | 0 | 4 | 0 | | 41 | 0 | 0 | 0 | 0 | 0 | 0 | 0 | 0 | 2 | 1 |
| | 0 | 0 | 0 | 0 | 1 | 1 | | 25 | 23 | 1 | 0 | 0 | 0 | 0 | 0 | 0 | 0 |
| | 0 | 0 | 0 | 1 | 0 | 3 | 3 | | 3 | 1 | 2 | 1 | 0 | 0 | 0 | 0 | 0 |
| | 0 | 0 | 0 | 0 | 0 | 0 | 1 | 3 | | 0 | 0 | 26 | 0 | 0 | 0 | 0 | 0 |
| | 15 | 0 | 0 | 0 | 26 | 0 | 0 | 0 | 1 | | 0 | 56 | 0 | 0 | 0 | 1 | 2 |
| | 4 | 0 | 0 | 0 | 0 | 0 | 0 | 0 | 11 | | 100 | 0 | 0 | 0 | 0 | 0 | 1 |
| | 9 | 0 | 0 | 0 | 0 | 0 | 0 | 2 | 47 | 0 | | 0 | 0 | 0 | 0 | 1 | 3 |
| | 0 | 0 | 0 | 0 | 0 | 0 | 0 | 0 | 0 | 0 | 0 | | 377 | 5 | 7 | 91 | |
| | 0 | 0 | 0 | 0 | 0 | 0 | 0 | 0 | 0 | 0 | 0 | 120 | | 274 | 1 | 0 | |
| | 0 | 0 | 0 | 0 | 0 | 17 | 5 | 8 | 2 | 0 | 0 | 0 | 9 | 0 | | 131 | 0 |
| | 0 | 0 | 0 | 0 | 0 | 2 | 11 | 22 | 0 | 0 | 0 | 0 | 0 | 0 | 219 | | 0 |
| | 0 | 0 | 0 | 0 | 0 | 0 | 1 | 0 | 3 | 2 | 0 | 0 | 0 | 0 | 70 | 31 | |

FROM FIG. 6A

| ORIGIN | DESTINATION | VOLUME |
|---|---|---|
| 12 | 14 | 401 |
| 29 | 30 | 377 |
| 17 | 18 | 369 |
| 30 | 31 | 274 |
| 11 | 10 | 243 |
| 32 | 31 | 219 |
| 10 | 11 | 217 |
| 14 | 12 | 183 |
| 18 | 19 | 180 |
| 19 | 20 | 175 |
| 11 | 14 | 132 |
| 31 | 32 | 131 |

FIG. 9

ORIGIN-DESTINATION ESTIMATION SYSTEM FOR A TRANSPORTATION SYSTEM

BACKGROUND

The present disclosure relates to analyzing and providing a graphical representation of data for a transportation system, such as a public bus, train or plane system. More specifically, the present disclosure relates to analyzing and providing a graphical representation of origin-destination data for a transportation system indicative of user flow throughout the transportation system.

For a typical public transportation company, the process of determining what combination of resources should be allocated to a particular route can be very challenging. Transportation service operators want to ensure that vehicles and personnel are deployed in an efficient manner that maximizes their use while avoiding overcapacity situations. Design challenges arise from the inherent variability in a transportation system, such as demand for transit, operator performance, traffic, weather, road construction, crashes, and other unavoidable or unforeseen events. Transportation companies desire a complete understanding of operational parameters of the transportation system, such as passenger flow rates, and balancing those parameters with adequate service levels, e.g., having enough vehicles on the correct routes at the correct times to handle anticipated passenger flow.

SUMMARY

In one embodiment, a processor implements computer-readable programming instructions to determine origin-destination (OD) data for a transportation system. The system does this by receiving passenger statistics collected from a set of data collection devices deployed throughout a transportation system, and by developing a model representing passenger usage of at least a portion of the transportation system. The model includes a network that comprises: (1) a set of nodes, wherein each of the plurality of nodes represents a geographical area of the transportation network; and (2) a plurality of links, wherein each of the plurality of links represents one or more transportation routes that connect two of the plurality of nodes. The system determines link utilization rates for each of the links by applying the passenger statistics to the model, wherein each link utilization rate represents a measurement of passenger usage of its corresponding link. The system also generates an observation report comprising an origin-destination matrix for at least the portion of the transportation system so that the origin-destination matrix comprises the determined link utilization rates, and it outputs a results set including at least a portion of the observation report.

The system also may receive a time period for the observation report. If so, then when determining the link utilization rates, the system may use passenger statistics that correspond to the received time period.

Optionally, the system may determine a cost of each link, and it may include each determined cost in the observation report. In addition, the system may use each link's cost to determine a likelihood that a passenger will select the link or another available link to reach a destination, and it may include each determined likelihood in the observation report.

Optionally, when developing the model, the system may: (1) determining a set of geographical areas included within the transportation system; determine the of nodes so that each of the nodes is associated with one of the determined geographical areas; (3) determining the of links so that each of the links represents a transportation route between two nodes using a transportation system vehicle or via walking; and (4) for each of the of links, determine an associated cost. When determining the geographical areas, the system may: (i) receive, via a user interface, a user geographic selection; (ii) use the user geographic selection to determine a plurality of transportation analysis zones; and (iii) use the determined transportation analysis zones to determine a plurality of combined analysis zones, wherein each combined analysis zone comprises one or more transportation analysis zone and is determined based upon geographic similarity or common public use of the transportation analysis zones comprised therein.

Optionally, when determining the link utilization rate for each link, the system may determine sub-ink utilization rates for a set of sub-links that make up the link, estimate an overall link utilization rate for passengers who traveled across all sub-links that make up the link, and use the estimated link overall utilization rate as the determined link utilization rate. Optionally, each of the plurality of links comprises a link type, wherein the link type comprises at least a stop connector link, a walking link, or a centroid connector link. The system may include the link type in the observation report.

In some embodiments, the data collection devices are automated passenger count devices. The automated passenger count devices may collecting the passenger statistics and send the passenger statistics to the processing device.

BRIEF DESCRIPTION OF THE DRAWINGS

FIGS. 6A and 6B depict an output origin-destination table according to an embodiment.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

As used herein, a "computing device" refers to a device that processes data in order to perform one or more functions. A computing device may include any processor-based device such as, for example, a server, a personal computer, a personal digital assistant, a web-enabled phone, a smart terminal, a dumb terminal and/or other electronic device capable of communicating in a networked environment. A computing device may interpret and execute instructions.

A "trip" represents an instance of travel from an origin point i to a destination point j. A trip may be represented as $T_{ij}$.

An "origin-destination matrix" or "OD matrix" refers to a table (or electronic data file representing a table) showing a distribution of trips from various origins to various destinations. Each cell in the matrix displays a measurement of trips going from a specific origin to a specific destination. The number in each cell may be an actual measurement, or it may be scaled by time, total trips, or another appropriate factor. For example, for a transportation system, each cell can display the number of passengers going from a specific origin stop within the transportation system to a specific destination stop within the transportation system.

The present disclosure is directed to a method and system for analyzing data from a service provider, such as a public transportation system service provider, and providing a graphical representation of origin-destination information as determined from the analyzed data. For example, public transportation companies monitor passenger related analytics for a transportation system. Generally, the analytics reflect average performance of the transit system, variation of the performance over time, and a general distribution of performance over time. For a public transportation system, low quality of service can result in decreased ridership, higher costs and imbalanced passenger loads. From a passenger perspective, reliable service requires origination and destination points that are easily accessible, predictable arrival times at a transit stop, short running times on a transit vehicle, balanced passenger loads, and low variability of running time. Poor quality of service can result in passengers potentially choosing another transportation option, thereby hurting the public transportation company's potential income.

In an embodiment, a transportation system may use a computer aided dispatch/automated vehicle location (CAD/AVL) system to monitor and store data that is used to determine historical passenger statistics for a particular route (e.g., time and location of a stop, dwell time, and other related statistics). A CAD/AVL system will comprise one or more processors, data storage facilities, and programming instructions that cause the CAD/AVL system to perform some or all of the operations described in this document. Portions of the CAD/AVL system may be centrally located, such as at a dispatch center. Other portions of the system may include data collection devices located on vehicles, at stops or along routes of the transportation system, and may be equipped with communications hardware to send data to the centrally located portion. For example, any or all vehicles in the public transportation system may include an automated passenger count (APC) device for measuring the number of passengers that board and alight at each stop in the system. Based upon this collected passenger information, the present disclosure further provides a method of creating an OD matrix for a transportation system based upon modeling a network based upon the historic data and providing a graphical representation of the OD information.

Analysis and visualization of the data may be interactive for one or more users. Thus, the process used for analysis and visualization may be optimized for fast performance, and the data may be retrieved from a real-time database.

For each passenger using the transportation system, a trip may be assigned where the trip includes the stop the passenger boards a vehicle and a stop where the passenger alights the vehicle. However, using conventional techniques related to departure or alighting information provides an incomplete view of the transportation system, as there is no definitive information as to where the passenger alighted the vehicle, only an assumption that at some point along the vehicle's route the passenger departed.

Based upon the information collected from the APC system, a transportation system operator may know the total number of people boarding at each origin stop as well as the total number of people of people alighting at each destination stop in the transportation system. Information such as information collected in a census, household survey, or rider survey may also be available, indicating the common trips of a surveyed rider. Additional information such as information collected from uniquely identifiable fare cards may also be available, indicating passenger boarding information and possibly passenger alighting information. However, trip information for individual passengers from each origin stop to each destination stop is not universally known. Thus, there may be a high number of possible solutions for the OD matrix consistent with the information at hand, or none at all, and a challenge is to find an optimal solution in a short amount of time, preferably suitable for interaction while the data is still being collected.

Figure 1:
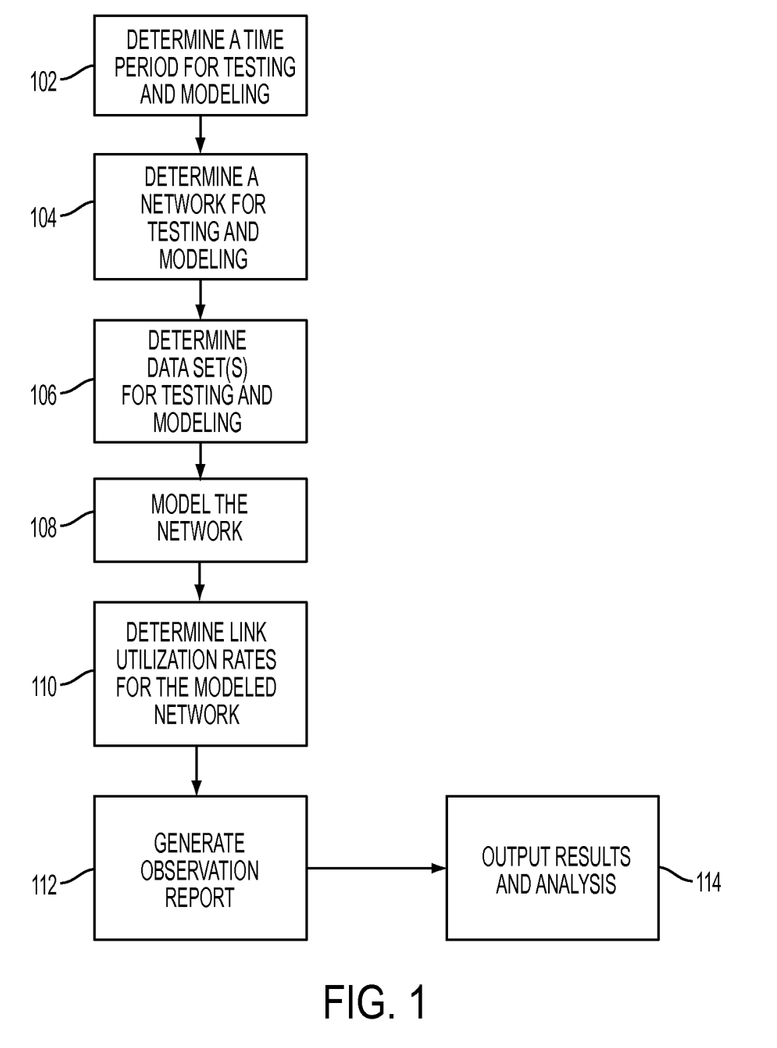
FIG. 1 depicts a process for modeling origin-destination information for a network according to an embodiment.

The techniques and processes as described in this document provide more specific estimates of origin-destination information for a transportation system. For example, FIG. 1 depicts a process for modeling origin-destination information for a transportation network, and outputting results to a user, the results indicative of operating characteristics such as passenger flow for the transportation network. A computing or processing device, such as a central server or workstation associated with a transportation network and functioning to monitor and provide operational information related to the transportation network, may initiate a software package or collection of algorithms to model the origin-destination information for the transportation network for a specific period of time. The computing device may implement a user interface that by which a user may select or enter various parameters, such as time constraints or geographic area indicators, that the system will use to implement its model and develop its reports.

For example, the processing device may model the origin-destination information for a day, a week, a month, or some other period of time. The processing device may determine 102 a time period by receiving a user-specified time selection via the user interface. For example, a user of the processing device may select to test and model the origin destination information for a transportation system during morning rush hour, e.g., 6:00 AM to 10:00 AM. Alternatively, the user may select to test and model the origin-destination information for a particular day of the week (e.g., Tuesday), a particular month (e.g., March), or another time period by applying passenger usage data collected during that time period to a network model as described below. Based upon the user's selection, the processing device may determine 102 a specific time period to test and model.

The processing device may further determine 104 a specific public transportation network (or portion of such a network) for testing. This may be a default network, or the system may receive a selection of a network via the user interface. For example, the network to be tested may be a particular route within the transportation system, a collection of routes within the transportation system, or the entire transportation system itself. In a bus transportation system, the entire system may include routes and bus stops distributed among the routes. A particular route within the transportation system may include any number of stops.

The processing device may determine 104 the network to be tested based upon a user-specified input. For example, a user of the processing device may use the user interface to select a particular route to test and model, and the processing device may determine 104 the network to test accordingly based on the received user selection.

The processing device may also determine 106 one or more data sets for using during the network testing and modeling. The data sets may include, for example, a database or other data structure including information collected by CAD/AVL devices associated with a central dispatch facility for the transportation network, a database or other data structure including information collected by the APC devices associated with the vehicles operating within the transportation network, a database or other data structure that includes additional passenger specific information such as information collected via survey or by monitoring passenger-specific automated fare cards, and other data sets. The data set(s) may be determined 106 based upon the user-selected time period and network for testing and modeling. For example, if a user selects to test and model origin-destination information for a particular route within the transportation system during rush hour, the processing device may determine 106 and extract the appropriate data from one or more data sets such as the CAD/AVL database and the APC database for that particular route and time period.

Figure 2:
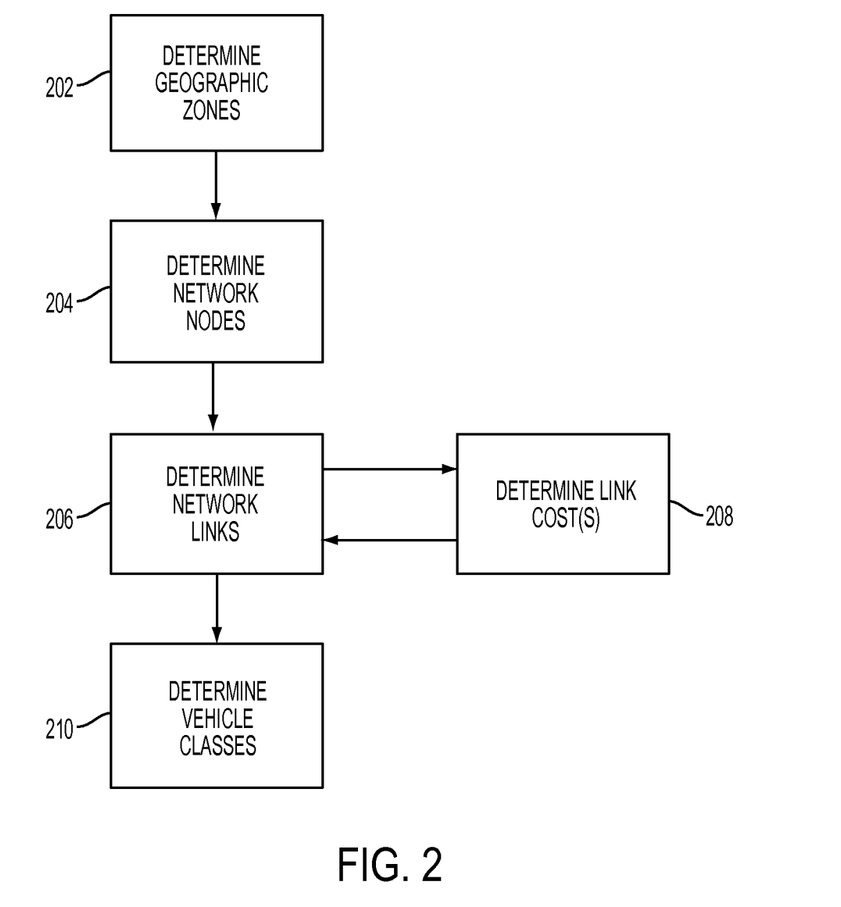
FIG. 2 depicts a process for modeling a network according to an embodiment.

Based upon the determined data sets for testing and modeling, the processing device may model 108 the network as a collection of geographic zones, nodes, links and vehicle classes. FIG. 2 shows an example process for modeling a network according to an embodiment. For example, the process as shown in FIG. 2 may include determining 202 one or more geographic zones for the transportation system. The processing device may determine 202 the geographic zones based upon several criteria. For example, based upon the level of desired specificity of the testing and modeling, the processing device may determine 202 the geographic zones such that each zone represents a single and distinct stop in the transportation system. However, for a large transportation system, such an approach may require a large number of geographic zones, resulting in a large amount of processing time and resources for modeling the network.

For example, in a transportation system with S stops, the OD matrix would have 2*S constraints and $S^2$ cells. It should be noted that in a medium sized city, the number of stops for a transportation system may be several thousand (e.g., 7,000). As such, an OD matrix for that system would have 49,000,000 cells. Thus, modeling such a network would require a large amount of processing resources. To simplify the processing, the OD matrix may be simplified by aggregating a set of individual stops into a transportation analysis zone (TAZ). For example, the 7,000 individual stops in the above system may be aggregated into 350 zones, each zone having an average of 20 stops. This results in an OD matrix having 122,500 cells. A processing device may be able to populate and analyze a matrix of that size much quicker than a matrix having 49,000,000 cells. Thus, when determining 202 the geographic zones, the processing device may combine one or more stops within the transportation system into a series of TAZs.

To further simplify processing, and increase the efficiency of the processing device when modeling the network, the TAZs may also be grouped into combined analysis zones. The processing device may base the combination of the TAZs into combined analysis zones upon one or more characteristics of the TAZs such as geographic location and common land use information such as common roads or transportation routes between TAZs.

Figure 3A:
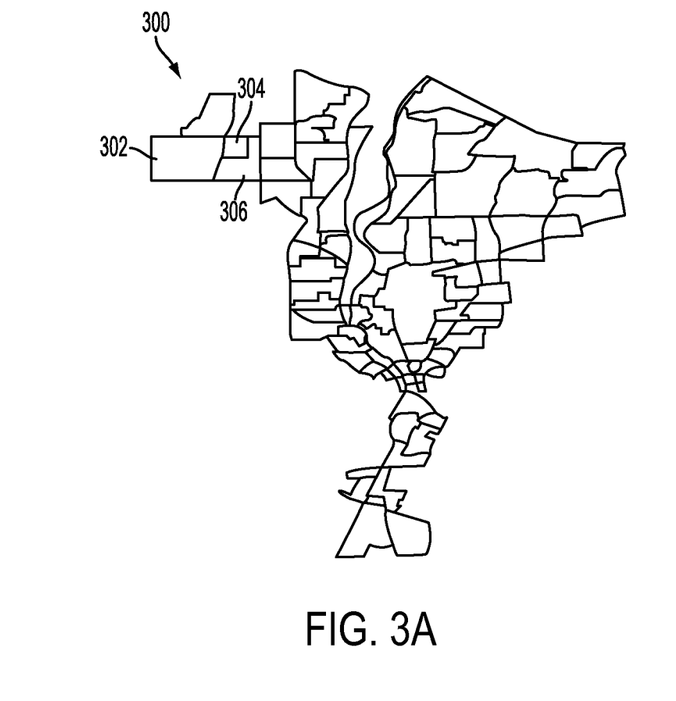
FIG. 3A depicts a geographic map showing a portion of a transportation system's coverage including traffic analysis zones according to an embodiment.
Figure 3B:
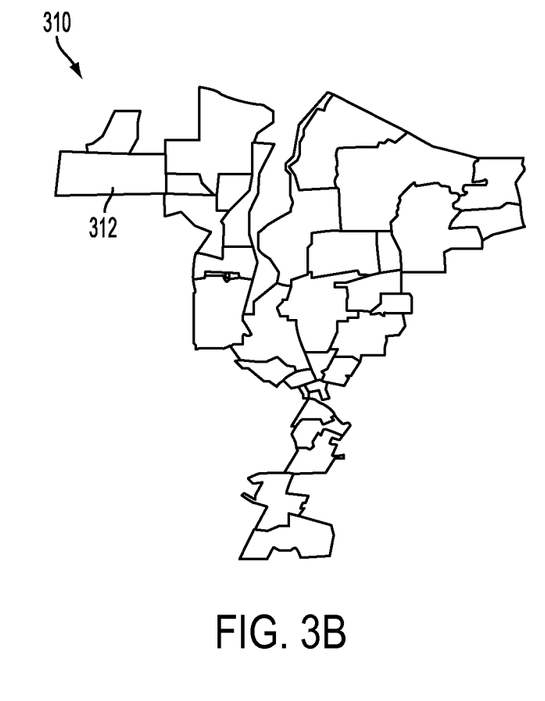
FIG. 3B depicts a geographic map showing combined traffic analysis zones according to an embodiment.

As shown in FIGS. 3A and 3B, groupings of two or more TAZs (as shown in map 300 of FIG. 3A) can be combined into combined analysis zones (as shown in map 310 of FIG. 3B). More specifically, TAZs 302, 304 and 306 as shown in map 300 may be grouped into combined analysis zone 312 as shown in map 310. Similarly, the remaining TAZs in map 300 may be grouped into a series of combined analysis zones. Such a combination, as described above, may further increase the efficiency and reduce the overall processing time of the processing device when modeling the network.

Returning to FIG. 2, the processing device may determine 204 a set of nodes for the network being modeled. For example, each node may be associated with a bus stop or, in this example using combined analysis zones, with a geographic area such as a combined analysis zone. Each zone may have two associated nodes, one for origin and one for destination. When storing the nodes (e.g., in a database or other similar structure), the processing device may assign a specific name to the node such that its location and type may be determined. For example, if the node is an origin node, the processing device may insert a one after the node number. Conversely, if the node is a destination node, the processing device may insert a two after the node number. Thus, node "161" may represent the origin node for combined analysis zone 16, and "162" may represent the destination node for combined analysis zone 16. Thus, in map 310 as shown in FIG. 3B, the 33 combined analysis zones shown therein results in 66 nodes associated with potential origin and destination zones for a person utilizing the transportation system illustrated in the map.

Additionally, the processing device may determine 206 one or more links for each determined node. In a particular network, there may be one or more types of links. For example, in a transportation network, there may be stop connectors, walking links, and centroid connectors (links connecting the centers of transportation zones). A set of parameters may be associated with each link. For example, each link may include a "from" node representing a point of origin, a "to" node representing a destination, a link length, a capacity, and a free flow speed representing a measure of speed of travel for vehicles along the link (such as a posted speed limit, or a measured average speed). The processing device may calculate link length based upon geographic location associated with each node (e.g., an origin and destination node pair for the link). Similarly, the processing device may calculate the passenger capacity of a link based upon an average number of vehicles traveling that link per unit of time (e.g., per hour) multiplied by the passenger capacity of the vehicles. For example, for a particular bus route link, the capacity may be number of buses traveling that link per hour times the capacity of the bus. The processing device may further determine the free flow speed for the link based upon the assigned speed limit for that link.

For walking links, the processing device may assign various constants for the parameters, such as, for example, a capacity of 60 pedestrians per meter per minute on a 3.5 meter wide walkway, thereby providing for a capacity of 12,600 pedestrians per hour. Similarly, the processing device may assign a free flow speed of, for example, 3.1 miles per hour as an average walking speed.

Figure 4A:
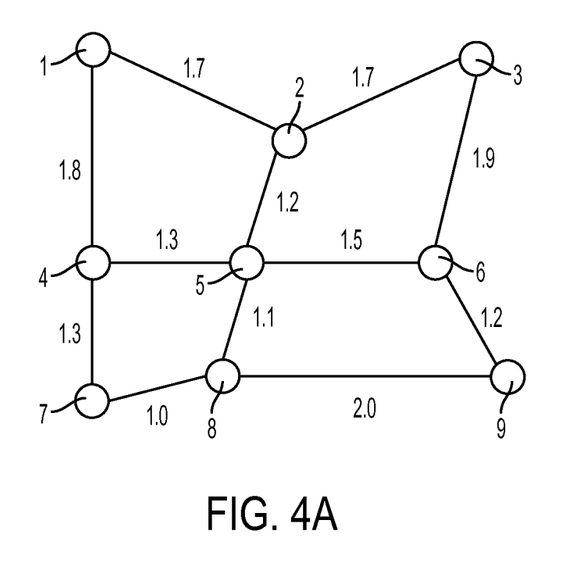
FIGS. 4A-4D illustrate various information related to an example of a modeled network according to an embodiment.

As shown in FIG. 4A, the processing device may produce a graphical representation of a network. The representation may include a set of nodes (represented by the circled numbers) as well as a set of links connected the nodes (represented by the lines drawn between the nodes). Additional information may be included in the representation such as, for example, a distance between each node along a particular link. For example, as shown in FIG. 4A, the link between node 1 and node 2 is 1.7 miles. However, it should be noted that the network as illustrated in FIG. 4A (and additional FIGS. 4B-4D) has been simplified for illustrative purposes.

Returning to FIG. 2, the processing device may further determine 208 one or more costs for each of the links. In this example, link costs may include travel time associated with the link and travel fees or other costs associated with the link. The processing device may determine a cost function for each link in the network, the cost function including standardized passenger flow between nodes, link length, and any associated rates for that link.

Figure 4B:
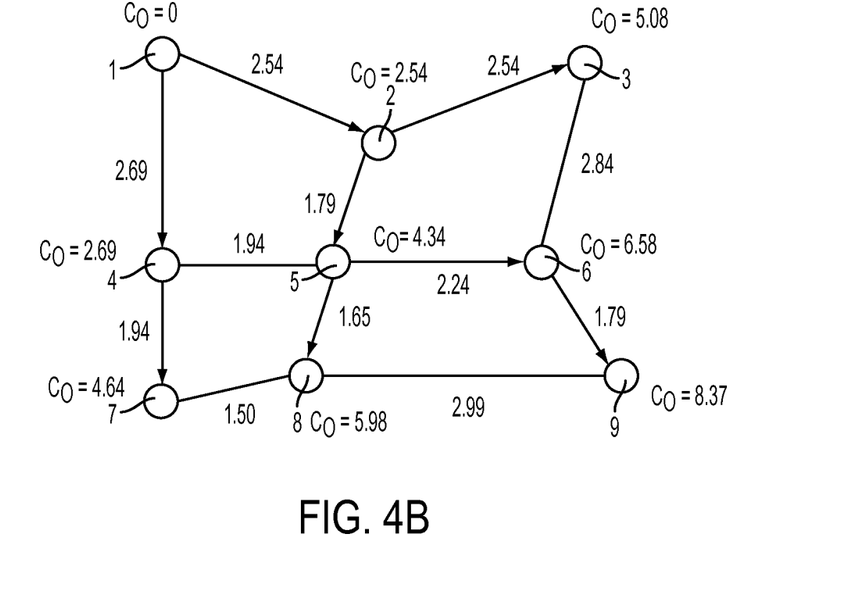

The processing device may use the determined cost function to determine the cost for each link in the network. As shown in FIG. 4B, each node may have an associated origin cost representing the cost of travel from the point or origin to that node. For example, node 1 is considered to be a point of origin for reference purposes and has an origin cost $C_O=0$ (as this is where it is assumed a passenger enters the network). Node 2, as shown in FIG. 2, has an origin cost $C_O=2.54$. This cost is directly attributed to the link between node 1 and node 2. Thus, the link between nodes 1 and 2 is labeled with a cost of 2.54. Additionally, as shown in FIG. 4B, node 3 has an origin cost $C_O=5.08$. However, as node 2 has a $C_O=2.54$, only a portion of the origin cost at node 3 is attributed to the link between nodes 2 and 3. In this example, the difference between the 5.08 (the $C_O$ of node 3) and 2.54 (the $C_O$ of node 2) is attributable to the link between nodes 2 and 3. Thus, as 5.08−2.54=2.54, only a cost of 2.54 is associated with the link between nodes 2 and 3.

Figure 4C:
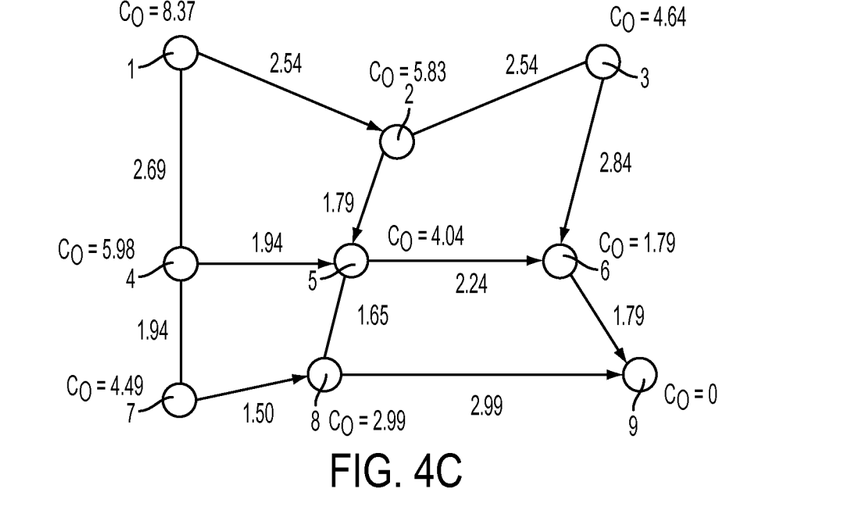
Figure 4D:
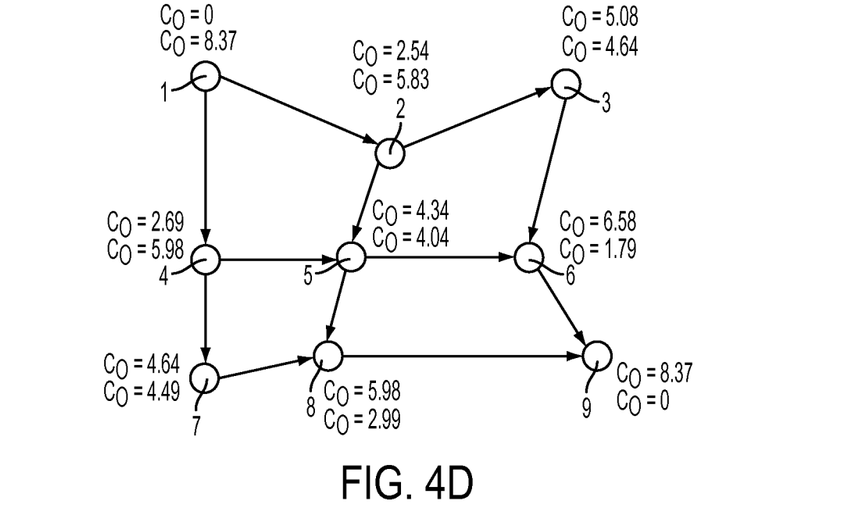

Additional, each node may have an associated destination cost representing a cost to reach a reference destination node from that node. As shown in FIG. 4C, each node has an associated total destination cost $C_D$. However, the individual link costs remain the same for the network. Thus, the original origin node (node 1) has the same destination node cost of 8.37 as the original destination node (node 9) has as an origin node cost. Conversely, the destination node cost of node 9 is the same as the origin cost of node 1. However, as the internal link costs within the network are not linearly determined or assigned, the internal nodes (e.g., nodes 2, 3, 4, 5, 6, 7 and 8) do not have a similar pattern. Rather, each of those nodes has a unique origin-destination cost pair. As shown in FIG. 4D, each node has an associated origin-destination cost pair $C_O$, $C_D$.

Returning to FIG. 2, the processing device may also determine 210 one or more vehicle classes for the network being modeled. For a transportation system, there, for example, may be one or more vehicle classes such as busses, light rail, subways, automobiles, ferry boats, and other similar vehicles for transporting people throughout the transportation system. For example purposes, it is assumed in this discussion that the processing device determines 210 that there is a single vehicle class, e.g., busses. However, any number or types of classes may be used.

Figure 5A:
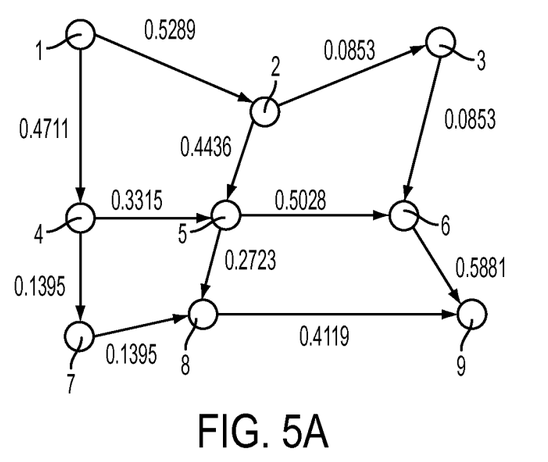
FIGS. 5A and 5B illustrate sample link utilization information for a modeled network according to an embodiment.

Referring again to FIG. 1, the processing device may further determine 110 link utilization rates for each link in the modeled network based upon the determined time period and data sets being used in the testing and modeling. Based upon the determined link costs as described above, as well as the link type (e.g., walking link or a stop connector link), the processing device may determine 110 a likelihood that a passenger will choose that link or a multi-node path that includes the link through the network over another link or multi-node path that ultimately leads to the same destination. Similarly, the system use the determined cost of a link to determine a proportion of passengers that travel over that link. As shown in FIG. 5A, a network (e.g., the same network as shown and described in relation to FIGS. 4A-4D) may be shown to include likelihood factors that an individual traversing the network would choose a specific link.

Figure 5B:
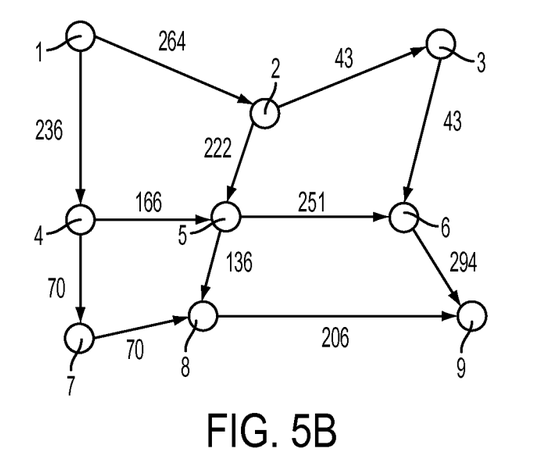

For example, when starting at node 1 and ending at node 9, there is a 52.89% likelihood that a person would first travel from node 1 to node 2, and a 47.11% likelihood that a person would first travel from node 1 to node 4. Based upon available passenger data, the processing device may determine (or have observational data confirming) that 500 people used the transportation system to travel from node 1 to node 9. The processing device may utilize the determined link utilization rates to calculate actual passenger numbers for each link in the network. To continue the above example, and as shown in FIG. 5B, 264 people travelling from node 1 to node 9 may first travel from node 1 to node 2, while 236 people may first travel from node 1 to node 4. It should be noted that the link utilization rates and passenger counts as described herein and shown in FIGS. 5A and 5B are shown by way of example only, and are merely provided for explanatory purposes.

Based upon the modeled network as well as the determined link utilization rates, the processing device may generate 112 an observation report. To generate 112 the observation report, the processing device may estimate an origin-destination table based upon analysis of each link and vehicle class as considered when modeling 108 the network as well as the determined link utilization rates. As described above, for a transportation system including only a single type of vehicle (i.e., a bus), the vehicle class is set to one, and a single set of origin-destination information may be determined for the set of links. However, such an arrangement is shown by way of example only, and a transportation network including multiple vehicle classes (e.g., a public transportation system including busses and light rail vehicles) may be tested and modeled using the same techniques and processes as described herein.

During generation 112, the processing device may estimate link utilization probabilities for each link in the network by incorporating the determine link utilization rates in an appropriate utilization algorithm. For example, the processing device may use a stochastic assignment model (SAM) algorithm to compute link utilization probabilities for the modeled network. As used herein, a SAM algorithm refers to a statistical technique for performing an iterative calculation for a data set including a set of nodes and multiple or overlapping links.

This is the idea exploited by J. M. Maher in "A stochastic assignment model," Mathematics in Transport Planning Control (Oxford University Press 1992) in which he constructed what he termed a Stochastic Assignment Model (SAM). Given a set of random link costs, $\tilde{C}_a$, assumed normally distributed, SAM operates from an origin node and moves through a network, performing two basic operations—scanning and merging. Outbound links from a given node are scanned to construct the distributions of cost to reach the ends of those links. Sets of inbound links to a given node are merged to construct the distribution of cost required to reach that node. Once a node has been merged, the links outbound from it are eligible for scanning. When all inbound links to a node have been scanned, that node is eligible to be merged. SAM can provide a very efficient algorithm for performing the required computations.

In concept, SAM calculates a set of probabilities that can be used to load all trips originating at the origin node (and terminating at all destinations) in a single pass. However, when doing so, it is quite easy to encounter a situation called "lock-up" in the algorithm, where no node is eligible to be merged and the algorithm cannot complete. This is not a problem in acyclic networks, but most transportation applications operate in networks where cycles are possible. It is possible to avoid the potential for lock-up by limiting the operations (and flows) to a set of "efficient" links, but doing so in a careful way forces the SAM algorithm to operate on a single O-D pair at a time, making it much more computationally intensive. The inventors have determined that for the current purposes, the benefits of using the concept of link efficiency outweigh any possible additional computational burden. For a given origin-destination pair, crossing an efficient link moves one further from the origin and closer to the destination. Links that are not on the shortest path from the origin to the destination can be efficient, as long as they are on paths that are generally moving in the right direction. However, the concept precludes cycling in the network because somewhere along a cyclic sub-path one must be moving "backwards"—i.e., getting closer to the origin and further from the destination. Thus, if flows are limited to paths made up of only efficient links there can be no cycles in the paths. For a single O-D pair, this allows the SAM algorithm to avoid the potential problem of lock-up.

Using the data sets as determined 106 above, the processing device may construct a set of link utilization probabilities using the SAM algorithm. The processing device may thus generate 112 the observation report as an output file as a result of iteratively repeating the SAM algorithm for the particular data sets. During each iteration of the SAM algorithm, the processing device may estimate a trip table indicating where a particular passenger boarded a vehicle, and where that particular passenger alighted the vehicle based upon the link utilization probabilities and associated link volumes, refining the specific origin-destination information based upon, for example, a set of specific parameters or expected output configuration for the output file.

To estimate the flow from each point or zone i to each other point or zone j, the system may deploy the following algorithm: First, as shown in FIG. 4A, one may be interested in the traffic or passenger flow from, for example, point 1 to point 9. There are several ways to get there using different segments or arcs. The flow from i to j is denoted by $q_{ij}$. What is observed is traffic volumes at some of the links. In the example of a public transit application, each link is part of a route that connects adjacent bus stops. A link may include any number of sublinks, each of which connects additional nodes and which together form an overall link from node i to node j. Traffic volume in this case is the number of passengers being transported across that link. That number is readable observed using automated passenger counters, which count the number of people getting on and off the bus at a bus stop. The system can also consider people walking or cycling to the bus stop as a link, the number of people on that link is the number of people getting on the bus (presumably, everyone got there by walking or cycling).

For a given link l, the number of observed passengers is $x_l$. Not all links are observed, so there are missing data. In general, each bus stop represents an opportunity to take another link, that is make a choice of which link to take. From the observed link counts, the task is to estimate the $q_{ij}$. We know for example, that link l is traversed on journeys from many originations to many destinations. Further, the system may not actually get to observe individuals' trips, so it won't actually see the links that individuals traversed on their journey from i to j. But the system can assume an equilibrium as part of the solution, that is, a model that shows what happens on average.

For example, the system may consider $p_{ij}^{l}(Q,c)$ to be the proportion of traffic (passengers) traveling from i to j that traverse link l. This quantity captures the idea that proportions are functions of the choices that people make and those choices are the result of knowing (imperfectly) the O-D matrix Q of quantities $q_{ij}$ and the costs associated with each link. The quantity c is a vector of costs, each component is a cost for each link. Link costs are those quantities that cause people to take one link instead of another. These can be very general, but typical costs are distance, travel time, and fares. Costs could also be perceived risks in getting to the destination on time, that is a notion of historical variation. Costs could also be numbers associated with safety, comfort, crowding on the bus, and amenities or other parameters. The system may determine costs in any suitable way, such as by retrieving them from one or more stored data files, by requesting administrator input, by receiving cost data as surveyed from passengers using the data collection system, or via other means. Thus, when presenting an observation report that includes an origin-designation matrix for a set of links, the system may also include a cost for each link in the report.

On average, the link counts should match the expected counts, for each link l:

$$x_l = \sum_{i,j} q_{ij} p_{ij}(Q, c)$$

Estimation of all $q_{ij}$ is problematic because each $p_{ij}(Q,c)$ changes when $q_{ij}$ changes.

The complete solution to estimating Q includes non-link observations. These could be observations from people transferring to new routes, for example. These might be detected by fare cards. Let these observations be $B_k$ and $$B_k = \sum_{ij} u_{ij} q_{ij}$$

Because there will likely be errors in measurement, one approximates as closely as possible by solving this optimization problem, $$\min f = \sum_k \eta_k \left( B_k - \sum_{ij} u_{ij} q_{ij} \right)^2 + \sum_l \tau_l \left( x_l - \sum_{ij} q_{ij} p_{ij}^l(Q, c) \right)^2$$

Weighting constants $\eta_k$ and $\tau_l$ allow control of the relative importance of link and non link data.

Figure 6B:
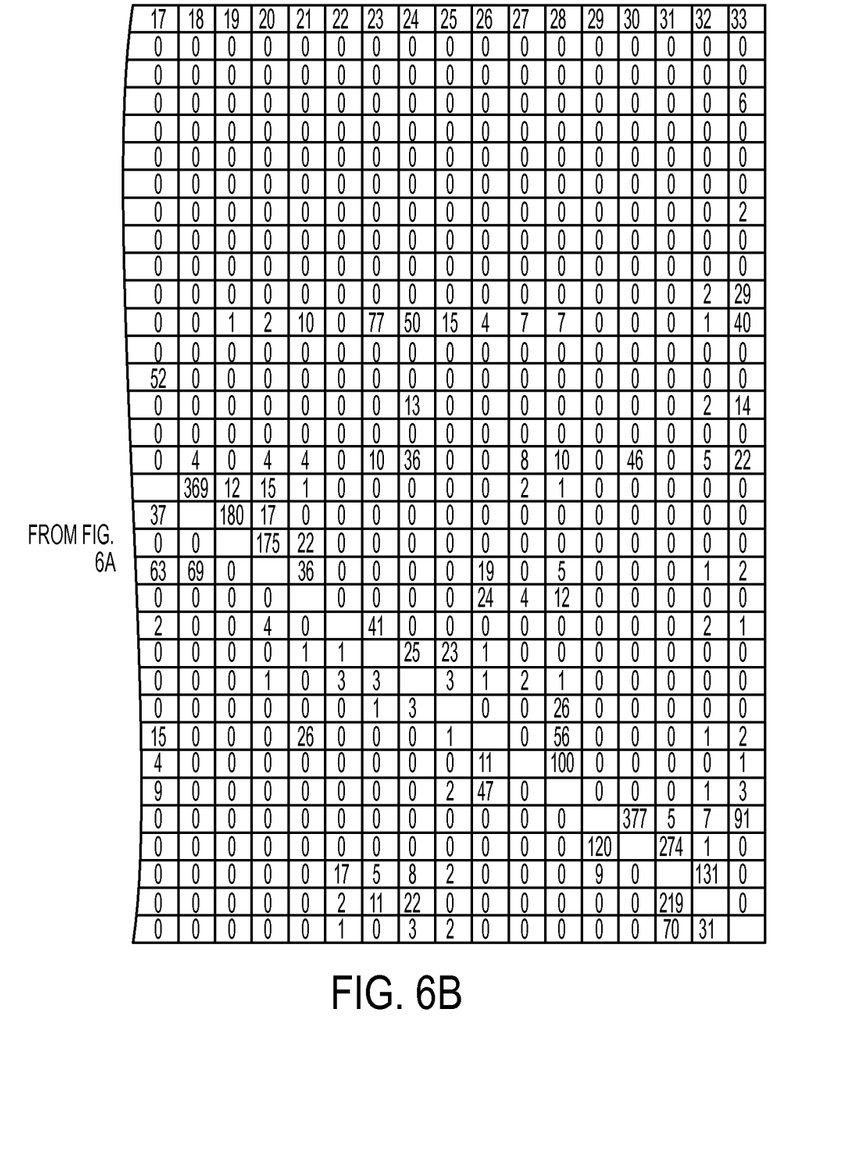

Based upon the generated output file, the processing device may present 114 an output including test and modeling results and analysis. For example, the processing device may generate and output 114 data from the observation report as an origin-destination table such as table 600 as shown in FIGS. 6A and 6B (where the table is broken into two parts due only to patent formatting limitations). As shown in table 600, a set 602 of origin nodes or stops is listed along the y-axis, and a set 604 of destination nodes or stops is listed along the x-axis. Where a particular row and column meet, the origin-destination table or matrix 600 lists the modeled measurement of trips between the origin and destination (in this case, the number of passengers that boarded a vehicle at a particular origin stop and departed the vehicle at a particular destination stop).

Figure 7:
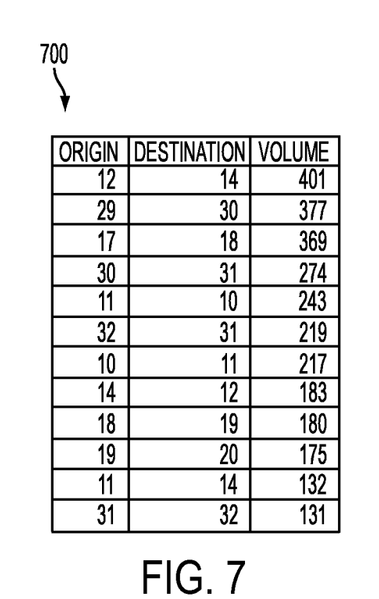
FIG. 7 depicts a sample sorted origin-destination information output table according to an embodiment.

Alternatively, or additionally, the processing device may output 114 additional origin-destination information. For example, as shown in FIG. 7, the processing device may output a sorted origin-destination information table 700. The processing device may filter the output information such that only a subset of the origin-destination information is output 114 to the user. For example, table 700 may include origin-destination information for a particular route within a transportation system, and the processing device may further sort the information such that it is presented in a specific order. As shown in FIG. 7, the information contained within table 700 may be sorted such that an origin-destination pair with the highest passenger volume is listed at the top of the table, and the subsequent origin-destination pairs are listed in descending order of passenger volume.

Figure 8:
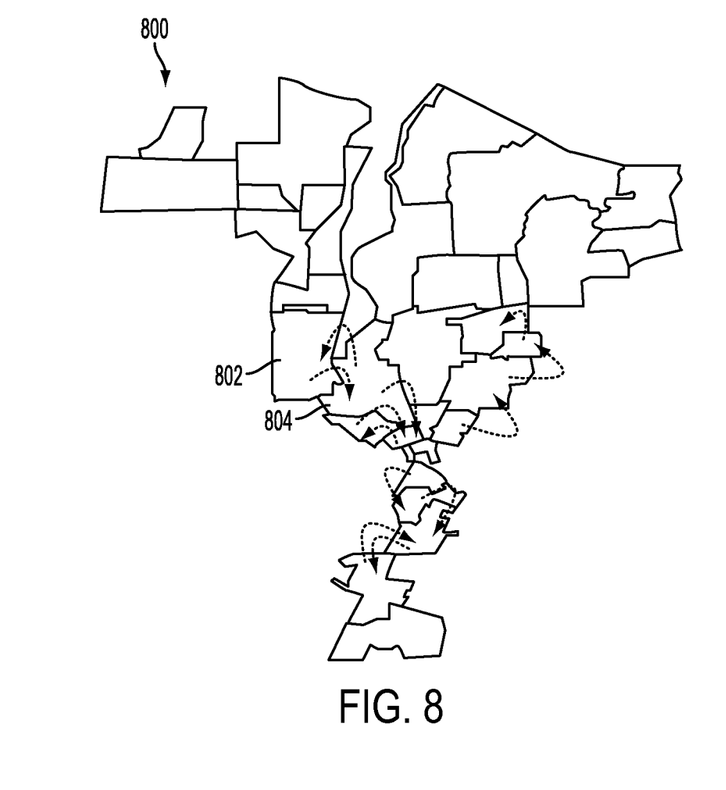
FIG. 8 depicts a geographic map including origin-destination information indicating passenger flow throughout the map according to an embodiment.

Additionally, the processing device may output 114 the output information as a graphical representation of the transportation network, or an area covered by the transportation network. For example, as shown in FIG. 8, the processing device may output 114 the origin-destination information on a map 800 of the geographical area covered by the transportation system, with the origin-destination information overlaid on the map. The processing device may overlay the origin-destination information as an indication of flow between various TAZs as is shown in FIGS. 6A and 6B. For example, map 800 indicates a passenger flow of 217 passengers that board a vehicle in TAZ 802 and depart the vehicle in TAZ 804.

Figure 9:
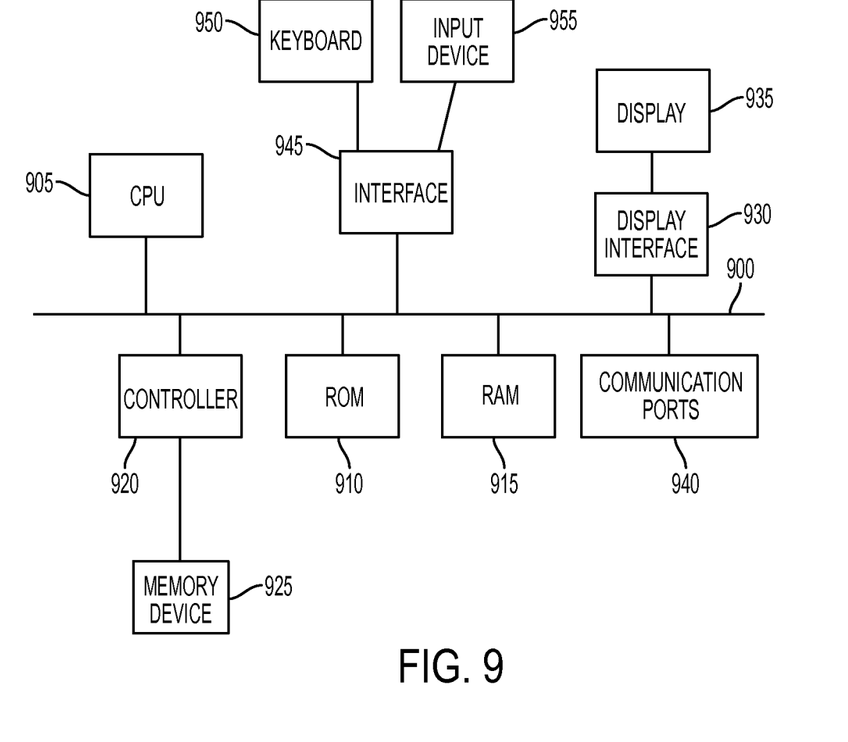
FIG. 9 depicts various embodiments of a computing device for implementing the various methods and processes described herein.

The origin-destination calculations and derivations, and visualization techniques as described above may be performed and implemented by one or more computing devices located at one or more locations, such as an operations center (e.g., a central operations center for a public transportation provider). FIG. 9 depicts a block diagram of various hardware that may be used to contain or implement the various computer processes and systems as discussed above. An electrical bus 900 serves as the main information highway interconnecting the other illustrated components of the hardware. CPU 905 is the central processing unit of the system, representing a processor (which may be a single processing device or multiple processing devices) performing calculations and logic operations required to execute a program. CPU 905, alone or in conjunction with one or more of the other elements disclosed in FIG. 9, is a processing device, computing device or processor as such terms are used within this disclosure. Read only memory (ROM) 910 and random access memory (RAM) 915 constitute examples of memory devices.

A controller 920 interfaces with one or more optional memory devices 925 to the system bus 900. These memory devices 925 may include, for example, an external or internal DVD drive, a CD ROM drive, a hard drive, flash memory, a USB drive or the like. As indicated previously, these various drives and controllers are optional devices. Additionally, the memory devices 925 may be configured to include individual files for storing any software modules or instructions, auxiliary data, incident data, common files for storing groups of contingency tables and/or regression models, or one or more databases for storing the information as discussed above.

Program instructions, software or interactive modules for performing any of the functional steps associated with the processes as described above may be stored in the ROM 910 and/or the RAM 915. Optionally, the program instructions may be stored on a tangible computer readable medium such as a compact disk, a digital disk, flash memory, a memory card, a USB drive, an optical disc storage medium, a distributed storage medium such as a cloud-based architecture, and/or other recording medium.

A display interface 930 may permit information to be displayed on the display 935 in audio, visual, graphic or alphanumeric format. For example, the OD information discussed in the context of FIGS. 6-8 may be embodied in the display 935. Communication with external devices may occur using various communication ports 940. A communication port 940 may be attached to a communications network, such as the Internet or a local area network.

The hardware may also include an interface 945 which allows for receipt of data from input devices such as a keyboard 950 or other input device 955 such as a mouse, a joystick, a touch screen, a remote control, a pointing device, a video input device and/or an audio input device, as well as output of data to a display, printer or a communications port. The reports of observation data may be presented on the display, printed by the printer, or transferred as a data file to another device via the communications port.

It should be noted that a public transportation system is described above by way of example only. The processes, systems and methods as taught herein may be applied to any environment where performance based metrics and information are collected for later analysis, and provided services may be altered accordingly based upon the collected information to improve reliability.

Various of the above-disclosed and other features and functions, or alternatives thereof, may be combined into many other different systems or applications. Various presently unforeseen or unanticipated alternatives, modifications, variations or improvements therein may be subsequently made by those skilled in the art, each of which is also intended to be encompassed by the disclosed embodiments.

The invention claimed is:

1. A method of determining origin-destination (OD) data for a transportation system, the method comprising:
   by a processing device, receiving passenger statistics collected from a plurality of data collection devices deployed throughout a transportation system;
   by the processing device, developing a model representing passenger usage of at least a portion of the transportation system, the model comprising a network that comprises:
      a plurality of nodes, wherein each of the plurality of nodes represents a geographical area of the transportation network, and
      a plurality of links, wherein each of the plurality of links represents one or more transportation routes that connect two of the plurality of nodes;

by the processing device, determining link utilization rates for each of the plurality of links by applying the passenger statistics to the model, wherein each link utilization rate represents a measurement of passenger usage of its corresponding link;

for each link, by the processing device:
determining a cost of the link based on at least computing a proportion of passengers that travel over that link, and
using each determined cost to determine a likelihood that a passenger will select the link to reach a destination;

by the processing device, generating an observation report comprising each determined likelihood for each link and an origin-destination matrix for at least the portion of the transportation system so that the origin-destination matrix comprises the determined link utilization rates; and outputting, by the processing device, a results set including at least a portion of the observation report.

2. The method of claim 1, further comprising, by the processing device:
receiving a time period for the observation report; and
when determining the link utilization rates, using passenger statistics that correspond to the received time period.

3. The method of claim 1, wherein developing the model comprises:
determining a plurality of geographical areas included within the transportation system;
determining the plurality of nodes, so that each of the nodes is associated with one of the determined geographical areas;
determining the plurality of links so that each of the links represents a transportation route between two nodes using a transportation system vehicle or via walking; and
for each of the plurality of links, determining an associated cost.

4. The method of claim 3, wherein determining the plurality of geographical areas comprises:
receiving, via a user interface, a user geographic selection;
using the user geographic selection to determine a plurality of transportation analysis zones; and
using the determined transportation analysis zones to determine a plurality of combined analysis zones, wherein each combined analysis zone comprises one or more transportation analysis zone and is determined based upon geographic similarity or common public use of the transportation analysis zones comprised therein.

5. The method of claim 1, wherein determining the link utilization rate for each link comprises:
determining sub-ink utilization rates for a plurality of sub-links that comprise the link;
estimating an overall link utilization rate for passengers who traveled across all sub-links that make up the link; and
using the estimated link overall utilization rate as the determined link utilization rate.

6. The method of claim 3, wherein each of the plurality of links comprises a link type, wherein the link type comprises at least a stop connector link, a walking link, or a centroid connector link.

7. The method of claim 1, further comprising:
determining a link type for each link; and
including each determined link type in the utilization report.

8. The method of claim 1, wherein the results set comprises one or more of the following: an ordered listing of OD information, a filtered listing of OD information, an OD matrix, or a geographical representation having OD information included therein.

9. The method of claim 1, wherein the data collection devices comprise automated passenger count devices, and the method further comprises:
by the automated passenger count devices, collecting the passenger statistics; and
sending the passenger statistics to the processing device.

10. A system for determining origin-destination data for a transportation system, the system comprising:
a processing device;
an output device comprising a display or printer; and
a computer-readable memory containing programming instructions that are configured to, when executed by the processor, cause the processor to:
receive passenger statistics collected from a plurality of data collection devices deployed throughout a transportation system,
develop a model representing passenger usage of at least a portion of the transportation system, wherein the model comprises:
a plurality of nodes, wherein each of the plurality of nodes represents a geographical area of the transportation network, and
a plurality of links, wherein each of the plurality of links represents one or more transportation routes that connect two of the plurality of nodes,
determine link utilization rates for each of the plurality of links by applying the passenger statistics to the model, wherein each link utilization rate represents a measurement of passenger usage of its corresponding link,
for each link:
determine a cost of the link based on at least computing a proportion of passengers that travel over that link, and
use each determined cost to determine a likelihood that a passenger will select the link to reach a destination,
generate an observation report comprising each determined likelihood for each link and an origin-destination matrix for at least the portion of the transportation system so that the origin-destination matrix comprises the determined link utilization rates; and
causing the printer or display to output a results set including at least a portion of the observation report.

11. The system of claim 10, further comprising additional programming instructions that are configured to, when executed by the processor, cause the processor to:
receive a time period for the observation report; and
when determining the link utilization rates, use passenger statistics that correspond to the received time period.

12. The system of claim 10, wherein the instructions to develop the model comprise instructions to:
determine a plurality of geographical areas included within the transportation system;
determine the plurality of nodes, so that each of the nodes is associated with one of the determined geographical areas;

determine the plurality of links so that each of the links represents a transportation route between two nodes using a transportation system vehicle or via walking; and for each of the plurality of links, determine an associated cost.

13. The system of claim 12, wherein the instructions to determine the plurality of geographical areas comprise instructions to:

output a user interface;

receive, via the user interface, a user geographic selection;

use the user geographic selection to determine a plurality of transportation analysis zones; and use the determined transportation analysis zones to determine a plurality of combined analysis zones, wherein each combined analysis zone comprises one or more transportation analysis zone and is determined based upon geographic similarity or common public use of the transportation analysis zones comprised therein.

14. The system of claim 10, wherein the instructions to determine the link utilization rate for each link comprise instructions to:

determine sub-ink utilization rates for a plurality of sub-links that comprise the link;

estimate an overall link utilization rate for passengers who traveled across all sub-links that make up the link; and use the estimated link overall utilization rate as the determined link utilization rate.

15. The system of claim 10, further comprising:

the data collection devices, wherein the data collection devices comprise automated passenger count devices that are configured to collect the passenger statistics and send the passenger statistics to the processing device.

16. A system for determining origin-destination data for a transportation system, the system comprising:

a processing device;

an output device; and a non-transitory computer-readable memory containing programming instructions that are configured to, when executed by the processor, cause the processor to:

receive passenger statistics collected from a plurality of data collection devices deployed throughout a transportation system, develop a model representing passenger usage of at least a portion of the transportation system, wherein the model comprises:

a plurality of nodes, wherein each of the plurality of nodes represents a geographical area of the transportation network, and a plurality of links, wherein each of the plurality of links represents one or more transportation routes that connect two of the plurality of nodes, determine link utilization rates for each of the plurality of links by applying the passenger statistics to the model and:

for at least one of the links, determining sub-ink utilization rates for a plurality of sub-links that comprise the link, and estimating an overall link utilization rate for passengers who traveled across all sub-links that make up the link, and using the estimated link overall utilization rate as the determined link utilization rate, for each link:

determining a cost of the link based on at least computing a proportion of passengers that travel over that link, and using each determined cost to determine a likelihood that a passenger will select the link to reach a destination, generate an observation report comprising:

each determined likelihood for each link, an origin-destination matrix for at least the portion of the transportation system so that the origin-destination matrix comprises the determined link utilization rates, and the determined cost for each link, and cause the printer or display to output a results set including at least a portion of the observation report.

17. The system of claim 16, further comprising:

the data collection devices, wherein the data collection devices comprise automated passenger count devices that are configured to collect the passenger statistics and send the passenger statistics to the processing device.

* * * * *